US012567536B2

(12) United States Patent
Shima et al.

(10) Patent No.: US 12,567,536 B2
(45) Date of Patent: Mar. 3, 2026

(54) IGNITION COIL ASSEMBLY WITH INTERNAL DIAGNOSTIC FEATURES

(71) Applicant: Federal-Mogul Ignition LLC, Northville, MI (US)

(72) Inventors: Ardit Shima, Modena (IT); Simone Daniele, Modena (IT); Stefano Papi, Modena (IT); Massimo A. Dalre, Modena (IT)

(73) Assignee: FEDERAL-MOGUL IGNITION LLC, Northville, MI (US)

( * ) Notice: Subject to any disclaimer, the term of this patent is extended or adjusted under 35 U.S.C. 154(b) by 204 days.

(21) Appl. No.: 18/650,422

(22) Filed: Apr. 30, 2024

(65) Prior Publication Data

US 2025/0336600 A1 Oct. 30, 2025

(51) Int. Cl.

| | |
|---|---|
| ***H01F 38/12*** | (2006.01) |
| ***F02P 13/00*** | (2006.01) |
| ***H01F 38/00*** | (2006.01) |
| ***H01T 15/00*** | (2006.01) |

(52) U.S. Cl.

CPC ............. *H01F 38/12* (2013.01); *H01T 15/00* (2013.01)

(58) Field of Classification Search

CPC ...... F02P 17/12; F02P 2017/125; F02P 11/06; F02P 3/0442; F02P 11/00; F02P 15/003; F02P 2017/121; F02P 3/04; F02P 3/0435; F02C 7/266; H01F 38/12; H01T 15/00

USPC .................. 123/644, 406.11, 619, 630, 647; 324/380, 399; 701/102

See application file for complete search history.

(56) References Cited

U.S. PATENT DOCUMENTS

| | | | | |
|---|---|---|---|---|
| 5,155,437 | A | 10/1992 | Frus | |
| 5,571,245 | A | 11/1996 | Ooyabu et al. | |
| 7,581,534 | B2 * | 9/2009 | Aida | F02P 17/12 123/619 |
| 10,947,949 | B2 * | 3/2021 | Lee | F02P 17/12 |
| 11,408,389 | B2 * | 8/2022 | Terada | H01F 38/12 |
| 11,448,178 | B2 | 9/2022 | Taguchi et al. | |
| 2019/0190238 | A1 * | 6/2019 | Yamamoto | F02P 3/055 |
| 2022/0275783 | A1 | 9/2022 | Carugati et al. | |
| 2023/0052720 | A1 | 2/2023 | Um | |

FOREIGN PATENT DOCUMENTS

WO WO-2017030889 A1 * 2/2017 ............ H01T 15/00

* cited by examiner

*Primary Examiner* — Elim Ortiz

(74) *Attorney, Agent, or Firm* — Reising Ethington P.C.

(57) ABSTRACT

An ignition coil assembly with internal diagnostic features that can be used to monitor and evaluate different aspects of an ignition system and provide continuous feedback. The ignition coil assembly may be a coil-on-plug type device that converts low-voltage battery power into high-voltage ignition pulses, and may include several input terminals, an ignition coil with primary and secondary windings, ignition circuitry, an output terminal, a spark plug connector, and a housing. The ignition circuitry includes an ignition operational circuit and an ignition diagnostic circuit, which in turn has a charging evaluation circuit for monitoring a charging phase, a discharging evaluation circuit for monitoring a discharging phase, and a feedback integration circuit for combining outputs into a multiplexed digital signal that can then be sent to an engine control unit (ECU) or the like over a single output terminal.

18 Claims, 3 Drawing Sheets

IGNITION COIL ASSEMBLY WITH INTERNAL DIAGNOSTIC FEATURES

FIELD

The present disclosure generally relates to ignition coil assemblies for use with combustion engines and, more particularly, to ignition coil assemblies with internal diagnostic features that can be used to monitor and evaluate different aspects of an ignition system.

BACKGROUND

The performance of a combustion engine can be impacted by different aspects of and conditions in its ignition system, which can change over the operational life of the engine. For example, a spark plug can become "fouled" due to the presence of oil, water and/or other residuals in the combustion chamber and the fouling can cause a deposit layer to form at a firing end of the spark plug where a spark gap is located. Over time, the deposit layer, which is somewhat conductive, can build up until the point where it creates an alternative spark path that suppresses an intended spark and/or short circuits an intended spark gap. This can cause a slew of problems, ranging from poor gas mileage and reduced engine performance to rough idling and engine misfires.

Some convention combustion engines include diagnostic features that monitor different aspects of the ignition system. For instance, there are known ignition systems that include diagnostic features for monitoring the charging or the discharging phase of the ignition coil, however, they oftentimes only provide a diagnostic signal when a fault or malfunction (e.g., misfiring) is detected, as opposed to providing continuous feedback that can be used by the engine to improve performance. Other known ignition systems may have diagnostic features that provide more continuous types of feedback, but they are oftentimes limited to the input side (i.e., the primary winding), the output side (i.e., the secondary winding), the spark plug or some other narrow part of the ignition system. Such diagnostic features do not necessarily provide a full or complete picture of the ignition system, in terms of the input side, the output side and the spark plug on a continuous basis. One example of a known ignition system diagnostic feature is an ion current sensor, which applies a small voltage to a spark gap following a sparking event and then measures the ionization current and its behavior over time. These measurements are typically provided to the engine in the form of an analog signal and can indicate the presence of a fouled or worn spark plug, but do not provide much information regarding the input and output sides of the ignition system. Furthermore, these types of analog signals are typically very low in signal strength and are more susceptible to electromagnetic (EM) noise in the ignition system.

It is, therefore, an object of the present application to provide an ignition coil assembly with internal diagnostic features that address and overcome some of the drawbacks in known ignition systems, as outlined above.

SUMMARY

According to one embodiment, there is provided an ignition coil assembly for use in an ignition system, comprising: a plurality of input terminals; an output terminal; an ignition coil having a primary winding and a secondary winding; and ignition circuitry having an ignition operational circuit and an ignition diagnostic circuit, the ignition operational circuit is configured to manage charging and discharging the ignition coil and is coupled to at least some of the input terminals and to the ignition coil, the ignition diagnostic circuit is configured to monitor different aspects of the ignition system and is coupled to the ignition coil and to the output terminal, wherein the ignition diagnostic circuit is configured to provide continuous feedback to the ignition system by sending a diagnostic signal over the output terminal, the diagnostic signal includes information representative of both a charging phase and a discharging phase.

In accordance with the various embodiments, the ignition coil assembly may have any one or more of the following features, either singly or in any technically feasible combination:

- the plurality of input terminals includes a first low-voltage input terminal configured to receive low-voltage battery power from a battery, a second low-voltage input terminal configured to receive a trigger signal from an engine control unit (ECU), a third low-voltage input terminal configured to receive battery ground, and a fourth low-voltage input terminal configured to receive engine ground, the plurality of input terminals and the output terminal are part of a unified multi-pin electrical connector;
- the plurality of input terminals includes a low-voltage input terminal configured to receive battery ground and a separate low-voltage input terminal configured to receive engine ground, the battery ground and the engine ground are electrically isolated from one another so that the diagnostic signal is more immune to internal noise;
- the ignition operational circuit includes a driver circuit and a switch, the driver circuit includes an input configured to receive trigger signals from an engine control unit (ECU) and an output configured to provide trigger signals to the switch, the switch is an insulated-gate bipolar transistor (IGBT) and includes a first terminal connected to the primary winding of the ignition coil, a second terminal connected to the output of the driver circuit and configured to receive trigger signals, and a third terminal connected to the ignition diagnostic circuit, and the ignition operational circuit is configured so that the trigger signals cause the switch to either be "on" such that charging current flows through the primary winding or "off" such that charging current does not flow through the primary winding;
- the ignition diagnostic circuit includes a charging evaluation circuit coupled to the primary winding, a discharging evaluation circuit coupled to the secondary winding, and a feedback integration circuit coupled to the charging evaluation circuit, the discharging evaluation circuit, and the output terminal;
- the charging evaluation circuit includes a resistor, an operational amplifier, and a charging evaluation output, the resistor is connected in series with the primary winding in a charging path, the operational amplifier includes a first input connected to a terminal of the resistor, a second input connected to a reference voltage ($V_{REF}$), and an output connected to the charging evaluation output, the charging evaluation output is connected to the feedback integration circuit, the charging evaluation circuit is configured to output an active charging signal when a charging current flowing through the charging path exceeds a charging current threshold, and the charging evaluation circuit is configured to output an inactive charging signal when the charging current flowing through the charging path does not exceed the charging current threshold, and the charging current threshold is at least partially determined by the reference voltage ($V_{REF}$);

the charging evaluation circuit is configured to output an active charging signal to the feedback integration circuit when a charging current flowing through a charging path is greater than a charging current threshold, the feedback integration circuit is configured to combine the active charging signal with output from the discharging evaluation circuit to generate the diagnostic signal, the diagnostic signal includes a rising edge or a falling edge ($t_1$) that is representative of the active charging signal and can be used, in conjunction with a separate trigger signal ($t_0$), to determine a charging duration ($t_1-t_0$), the charging duration corresponds to an amount of time taken for the charging current to exceed the charging current threshold, and the charging duration is representative of a state or a condition of the primary winding;

the discharging evaluation circuit includes an opto-isolator with a light-emitting device and a light-activated switch, a resistor, and a discharging evaluation output, the light-emitting device is connected in series with the secondary winding in a discharging path, the light-activated switch is operably coupled to the light-emitting device and includes a terminal connected to a terminal of the resistor, the discharging evaluation output is connected to the feedback integration circuit, the discharging evaluation circuit is configured to output an active discharging signal when a discharging current flowing through the discharging path exceeds a discharging current threshold, and the discharging evaluation circuit is configured to output an inactive discharging signal when the discharging current flowing through the discharging path does not exceed the discharging current threshold, and the discharging current threshold is at least partially determined by properties of the light-emitting device and/or the light-activated switch;

the discharging evaluation circuit is configured to output an active discharging signal to the feedback integration circuit when a discharging current flowing through a discharging path is less than a discharging current threshold, the feedback integration circuit is configured to combine the active discharging signal with output from the charging evaluation circuit to generate the diagnostic signal, the diagnostic signal includes a rising edge or a falling edge ($t_3$) that is representative of the active discharging signal and can be used, in conjunction with a separate trigger signal ($t_2$), to determine a discharging duration ($t_3-t_2$), the discharging duration corresponds to an amount of time taken for the discharging current to fall below the discharging current threshold, and the discharging duration is representative of a state or a condition of the secondary winding or a corresponding spark plug;

the feedback integration circuit includes a logic gate and a switch, the logic gate includes a first input connected to a charging evaluation output of the charging evaluation circuit and configured to receive a charging signal, a second input connected to a discharging evaluation output of the discharging evaluation circuit and configured to receive a discharging signal, and an output configured to provide a combined charging and discharging signal, the switch includes a first terminal connected to the output terminal and a second terminal connected to the output of the logic gate and configured to receive the combined charging and discharging signal, and the feedback integration circuit is configured to utilize the combined charging and discharging signal to output the diagnostic signal over the output terminal; and the diagnostic signal includes information representative of both a charging signal generated during the charging phase and a discharging signal generated during the discharging phase, and the ignition circuitry is configured to combine the charging signal and the discharging signal into the diagnostic signal and to provide the combined diagnostic signal over the output terminal, which is a single pin in a multi-pin electrical connector.

According to another embodiment, there is provided a method of operating an ignition coil assembly for use in an ignition system, the ignition coil assembly comprises: a plurality of input terminals; an output terminal; an ignition coil having a primary winding and a secondary winding; and ignition circuitry having an ignition operational circuit and an ignition diagnostic circuit; the method comprises the steps of: managing charging and discharging of the ignition coil with the ignition operational circuit; monitoring different aspects of the ignition system with the ignition diagnostic circuit; and providing continuous feedback from the ignition diagnostic circuit to the ignition system by sending a diagnostic signal over the output terminal, wherein the diagnostic signal includes information representative of both a charging phase and a discharging phase.

In accordance with the various embodiments, the method of operating an ignition coil assembly may have any one or more of the following features, either singly or in any technically feasible combination:

the monitoring step further comprises monitoring a charging current flowing through a charging path that includes the primary winding, a switch and a resistor, and using an op amp to compare a voltage at a terminal of the resistor to a threshold voltage $V_{REF}$ and outputting an active charging signal when the voltage exceeds the threshold voltage, thereby indicating that the charging current has exceeded a charging current threshold;

the providing continuous feedback step further comprises sending a diagnostic signal that combines an active charging signal from a charging evaluation circuit with output from a discharging evaluation circuit, the diagnostic signal includes a rising edge or a falling edge ($t_1$) that is representative of the active charging signal, and further comprising the steps of: evaluating the diagnostic signal at an engine control unit (ECU), in conjunction with a separate trigger signal ($t_0$), to determine a charging duration ($t_1-t_0$), the charging duration corresponds to an amount of time taken for a charging current flowing through a charging path that includes the primary winding to reach a charging current threshold, and determining a state or a condition of the primary winding based on the charging duration;

the monitoring step further comprises monitoring a discharging current flowing through a discharging path that includes the secondary winding and a current evaluator with a light-emitting device and a light-activated switch, ceasing to emit light from the light-emitting device when the discharging current flowing through the discharging path does not exceed a discharging current threshold, turning "off" the light-activated switch when the light-emitting device ceases to emit light, and outputting an active discharging signal when the light-activated switch is turned "off,"

thereby indicating that the discharging current has fallen below the discharging current threshold;

the providing continuous feedback step further comprises sending a diagnostic signal that combines an active discharging signal from a discharging evaluation circuit with output from a charging evaluation circuit, the diagnostic signal includes a rising edge or a falling edge ($t_3$) that is representative of the active discharging signal, and further comprising the steps of: evaluating the diagnostic signal at an engine control unit (ECU), in conjunction with a separate trigger signal ($t_2$), to determine a discharging duration ($t_3-t_2$), the discharging duration corresponds to an amount of time taken for a discharging current flowing through a discharging path that includes the secondary winding to fall below a discharging current threshold, and determining a state or a condition of the secondary winding or a corresponding spark plug based on the discharging duration;

the providing continuous feedback step further comprises sending a multiplexed digital diagnostic signal that includes information from an active charging signal from a charging evaluation circuit and information from an active discharging signal from a discharging evaluation circuit, the multiplexed digital signal is sent over a single output terminal;

the plurality of input terminals include a low-voltage input terminal configured to receive battery ground and a separate low-voltage input terminal configured to receive engine ground, the battery ground and the engine ground are electrically isolated from one another so that the diagnostic signal is more immune to internal noise; and further comprising the step of receiving the diagnostic signal at an engine control unit (ECU) that is part of the ignition system for an engine that burns hydrogen fuel, and using the diagnostic signal to determine if the hydrogen burning engine has experienced any missed combustions.

DRAWINGS

Preferred embodiments will hereinafter be described in conjunction with the appended drawings, wherein like designations denote like elements, and wherein.

DESCRIPTION

Figure 1:
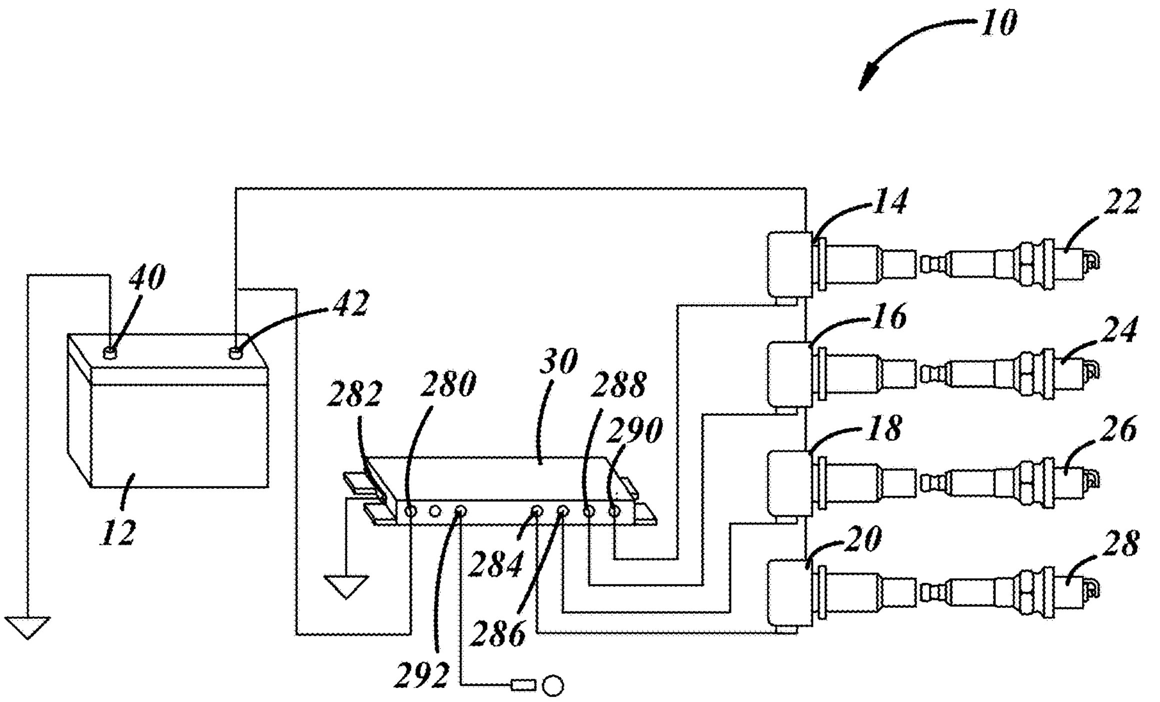
FIG. 1 is a schematic diagram of an exemplary ignition system.

The ignition coil assembly described herein includes internal diagnostic features that can be used to continuously monitor and evaluate different aspects of an ignition system and its operation, as will be described. With reference to FIG. 1, there is shown a schematic diagram of an exemplary ignition system 10 for use with a combustion engine having four cylinders, where the ignition system is a coil-on-plug type ignition system. Ignition system 10 may include a battery 12, ignition coil assemblies 14-20, spark plugs 22-28, an engine control unit (ECU) 30, as well as any number of other components, devices and/or units known in the art. As its name suggests, the coil-on-plug ignition system 10 includes a separate ignition coil assembly 14-20 mounted on each spark plug 22-28 so that each spark plug is directly fired by a certain, designated ignition coil. Those skilled in the art will appreciate that while coil-on-plug type ignition systems can provide a variety of benefits over conventional ignition systems, such as distributor-less systems, they can sometimes be more difficult in terms of diagnosing problems. Accordingly, each ignition coil assembly 14-20 is provided with internal diagnostic features that continuously monitor various aspects of the ignition system and send feedback to the ECU 30 via digital diagnostic signals that include information for evaluating the input side, the output side, the spark plug and/or other aspects of the ignition system. The digital diagnostic signals may include information representative of elapsed time durations between different ignition events, as well as other information. It is also possible for the present ignition coil assembly to be used with non-coil-on-plug type systems where ignition coils are remotely mounted and are connected to corresponding spark plugs via high voltage cables.

It should be appreciated that the ignition coil assemblies described herein may be used with a wide variety of engines and are not limited to the examples described below or shown in the drawings. For instance, the present ignition coil assemblies may be used with combustion engines that burn gasoline, diesel, natural gas, hydrogen, propane, biodiesel, ethanol and/or other types of combustible fuels; combustion engines that are used in cars, sport utility vehicles (SUVs), hybrid vehicles, light-duty trucks, medium-duty trucks, heavy-duty trucks, semi-trucks, buses, boats, aircraft, trains, construction equipment, mining equipment, tractors, generators, industrial engines and/or other types of automotive and industrial applications; combustion engines that include any number of cylinders, including more or less than four cylinders; and combustion engines that use port fuel injection (PFI), gasoline direct invention (GDI), electronic fuel injection (EFI) and/or other types of fuel injection, to name just a few possibilities. The ignition coil assemblies described herein may be used with any type of engine that utilizes a spark to ignite a combustible fuel.

Battery 12 provides ignition system 10 with low-voltage battery power and may be any suitable type of battery known in the art. For example, battery 12 may be a standard 12 V or 24 V, rechargeable, lead-acid, direct current (DC) battery, although other battery types may be used instead. Battery 12 includes a negative terminal 40 connected to battery ground (e.g., the vehicle chassis) and a positive terminal 42 connected to each of the ignition coil assemblies 14-20 and to the ECU 30. The positive terminal 42 preferably provides each of the ignition coil assemblies 14-20 with low-voltage battery power (e.g., 12 V-24 V DC).

Figure 2:
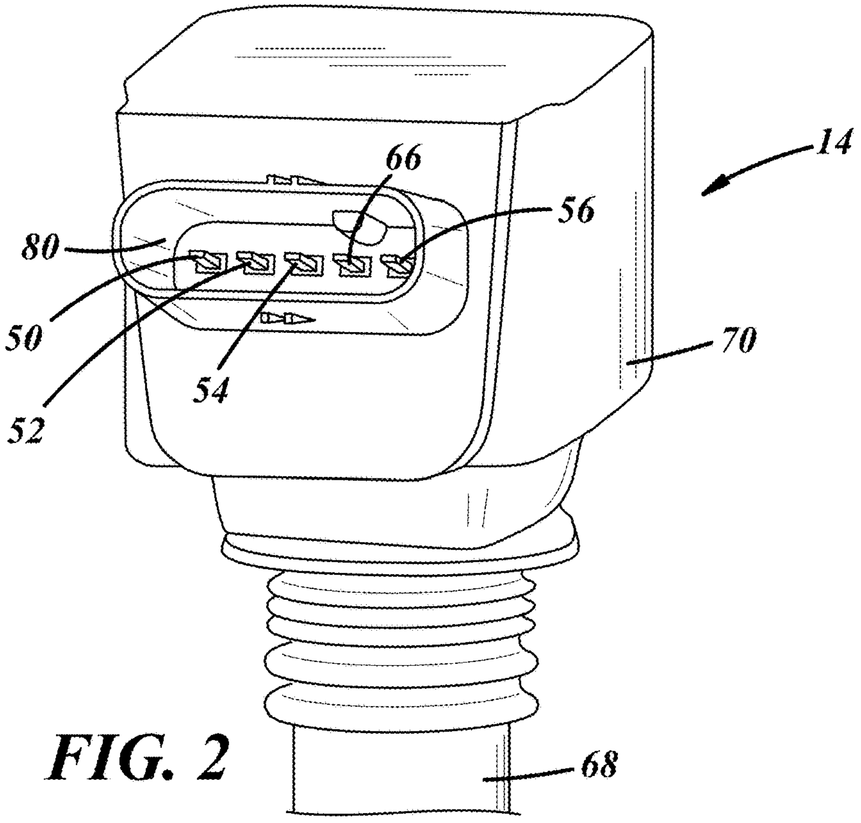
FIG. 2 is a perspective view of an exemplary ignition coil assembly that may be used with the ignition system of FIG. 1.
Figure 3:
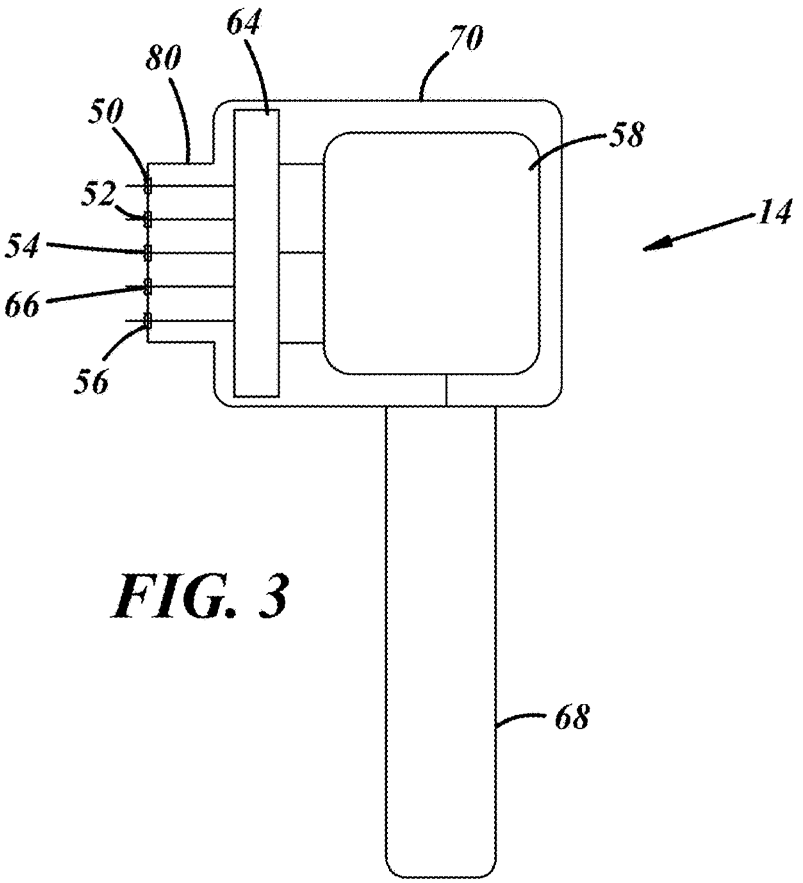
FIG. 3 is a schematic diagram of the ignition coil assembly of FIG. 2.
Figure 4:
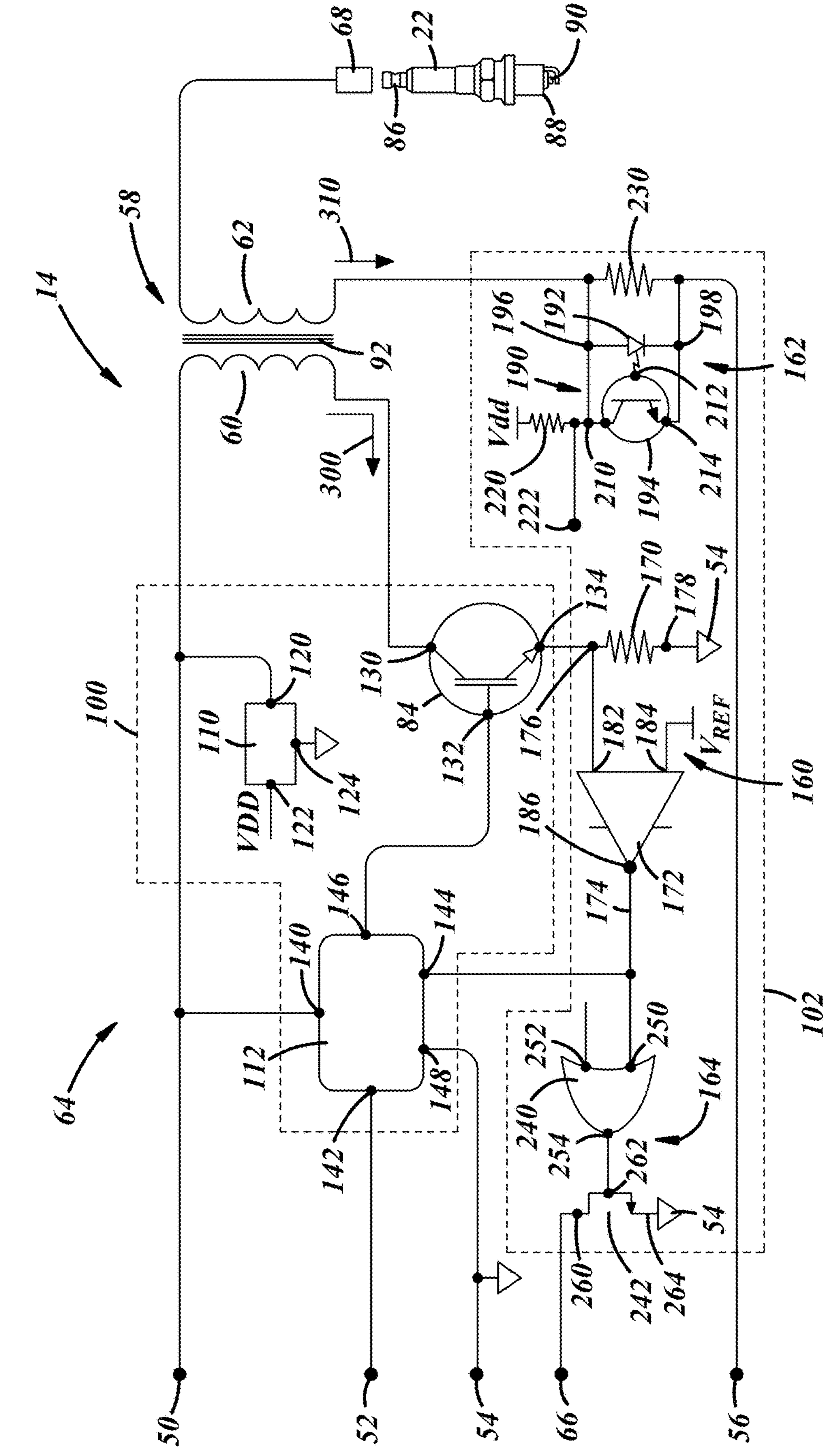
FIG. 4 is a circuit diagram of the ignition coil assembly of FIG. 2.

Ignition coil assemblies 14-20 convert low-voltage battery power into high-voltage ignition pulses that are provided to spark plugs 22-28 in order to initiate the combustion process. Ignition coil assemblies 14-20 may include any suitable type of automotive or industrial ignition coil known in the art, including various types of coil-on-plug and other ignition coils. For purposes of simplicity, the following description is provided in the context of ignition coil assembly 14 and spark plug 22, however, this description applies equally to the other ignition coil assemblies 16-20 and spark plugs 24-28 (duplicate descriptions have been omitted). As best shown in FIGS. 2-4, ignition coil assembly 14 generally includes several input terminals 50-56, an ignition coil 58 with primary and secondary windings 60 and 62, ignition circuitry 64, an output terminal 66, a spark plug connector 68, and a housing 70.

Input terminals 50-56 are electrical connections that provide the ignition coil assembly 14 with power, ground, control signals and/or other low-voltage inputs needed for operation. For instance, input terminal 50 may be a low-voltage pin that, when connected, is coupled to the positive terminal 42 of battery 12 and receives low-voltage battery power. Input terminal 52 may be a low-voltage pin that, when connected, is coupled to an output terminal of the ECU 30 and receives a trigger signal that causes spark plug 22 to fire according to an ignition timing dictated by the ECU. Input terminals 54 and 56 may be low-voltages pins that are respectively connected to battery ground (e.g., negative terminal 40 of the battery) and engine ground. Electrically isolating battery ground 54, sometimes referred to as ECU ground or body ground, from engine ground 56 helps provide the diagnostic signals with a certain degree of immunity against internal noise generated by the ignition system and/or combustion engine during operation, especially during firing of the spark plug. Input terminals 50-56, as well as output terminal 66, are shown in FIG. 2 as being part of a unified five-pin electrical connector 80 arranged on a side of the housing 70. Electrical connector 80 is designed to interface with a wiring harness or a complementary electrical connector of some sort that connects the ignition coil assembly 14 to the battery 12, the ECU 30, engine ground and/or other devices within the ignition system or the combustion engine. It is certainly possible, however, for the input and/or output terminals to be arranged according to some other configuration.

Ignition coil 58 is a transformer that includes primary and secondary windings 60, 62 and is responsible for converting low-voltage battery power to high-voltage ignition pulses that are then provided to the spark plug 22. According to the example shown in FIG. 4, a first terminal of primary winding 60 is connected to input terminal 50 and receives low-voltage battery power, whereas a second terminal of the primary winding 60 is connected to a switch 84 that is part of the ignition circuitry 64. As is well known in the art, when switch 84 is turned "on" such that electrical current flows through primary winding 60, an electromagnetic field is induced in ignition coil 58, including in secondary winding 62. When the switch 84 is turned "off" and the electrical current abruptly stops flowing through primary winding 60, the electromagnetic field suddenly collapses and induces a high-voltage ignition pulse in secondary winding 62. The high-voltage ignition pulse, which can be in the range of 5-50 kV or more, is then conveyed from secondary winding 62 to spark plug connector 68, which fits over top of and electrically connects to a terminal end 86 of the spark plug 22. In the example of a non-coil-on-plug system, the high-voltage ignition pulse would be sent from the secondary winding to the spark plug via a high voltage cable. From here, the high-voltage ignition pulse travels within the spark plug 22, from terminal end 86 to a firing end 88, where it arcs across a spark gap 90 and ignites an air/fuel mixture in a combustion chamber in order to initiate the combustion process. According to one non-limiting example, primary winding 60 includes 50-500 turns of wire and the secondary winding 62 includes 5,000-50,000 turns of wire (e.g., 100× more than the primary winding) and both windings are wound around a ferromagnetic core 92.

Ignition circuitry 64 is responsible for charging/discharging the ignition coil 58 in accordance with the desired ignition timing of the ignition system, as well as for providing feedback to the ignition system in the form of diagnostic signals. According to the example illustrated in FIG. 4, the ignition circuitry 64 includes an ignition operational circuit 100 and an ignition diagnostic circuit 102. The ignition operational circuit 100 manages aspects of charging and discharging ignition coil 58 and may include a voltage regulator 110, switch 84, a driver circuit 112, as well as any other suitable electronic components, units, circuits and/or other devices that are known in the art. Voltage regulator 110 is a DC-to-DC voltage regulator that includes an input 120 connected to low-voltage battery power, an output 122 that provides ignition circuitry 64 with regulated low-voltage DC power (VDD), and an input 124 connected to battery ground 54. According to one example, voltage regulator 110 is a low-dropout (LDO) regulator that can operate even when the supply voltage (low-voltage battery power) is very close to the output voltage (VDD). Switch 84 is a power transistor that includes a collector terminal 130 connected to primary winding 60, a gate terminal 132 connected to an output of driver circuit 112, and an emitter terminal 134 connected to ignition diagnostic circuit 102, as will be explained below. In one example, switch 84 is a high-power, insulated-gate bipolar transistor (IGBT) that is controlled with trigger signals provided by ECU 30. Driver circuit 112 regulates the gate current provided to power switch 84 and includes an input 140 connected to low-voltage battery power, an input 142 connected to ECU 30 for receiving trigger signals, an input 144 connected to ignition diagnostic circuit 102, an output 146 connected to gate terminal 132 of switch 84, and an input 148 connected to battery ground 54. The driver circuit 112 acts as an interface of sorts between ECU 30 and power switch 84. The term "trigger signal," as used herein, broadly includes all electronic signals that are designed to control the operational state of switch 84, including trigger signals sent directly from ECU 30 to switch 84 and trigger signals sent indirectly from ECU 30 to switch 84 via driver circuit 112 and/or other electronic devices.

Ignition diagnostic circuit 102 monitors various aspects of the ignition system, provides continuous feedback to the ignition system in the form of diagnostic signals, and may include a charging evaluation circuit 160, a discharging evaluation circuit 162, a feedback integration circuit 164, as well as any other suitable electronic components, units, circuits and/or other devices that are known in the art. As its name suggests, charging evaluation circuit 160 evaluates various aspects of the charging phase and includes a resistor 170, an operational amplifier (op amp) 172, battery ground 54, and a charging evaluation output 174. Resistor 170 is connected in series with primary winding 60 such that it is in a charging path and includes a first terminal 176 connected to switch 84 and a second terminal 178 connected to battery ground 54. In one example, resistor 170 has a resistance between 5 mΩ and 25 mΩ, but this is not required. Op amp 172 is preferably a current feedback op amp that compares the voltages seen at its non-inverting input 182 and its inverting input 184 and provides an output based on that comparison at output 186. Non-inverting input 182 is a high-impedance input connected to first terminal 176 of resistor 170 and inverting input 184 is a high-impedance input connected to a reference voltage ($V_{REF}$), such as battery ground 54. Charging evaluation output 174, which is connected to the output of op amp 172, acts as an output for charging evaluation circuit 160 and provides feedback integration circuit 164 with either an active or inactive charging signal, depending on the output of the op amp. It should be noted that charging evaluation circuit 160 may be arranged differently than the exemplary embodiment shown in FIG. 4, so long as it is configured to output an active charging signal when charging current 300 flowing through the charging path exceeds a charging current threshold and an inactive charging signal when the charging current does not exceed the charging current threshold. For instance, the non-inverting and inverting inputs 182, 184 could be switched such that the output of the op amp is switched; the inverting input 184 could be connected to second terminal 178 of resistor 170 such that reference voltage ($V_{REF}$) is battery ground 54, as opposed to a specific $V_{REF}$ value; and the sequence or arrangement of primary winding 60, switch 84, resistor 170 and/or battery ground 54 in the charging path could be changed, to cite a few possibilities.

Discharging evaluation circuit 162 evaluates various aspects of the discharging phase and includes a current evaluator 190, a resistor 220, a discharging evaluation output 222, and engine ground 56. Current evaluator 190 is connected in series with secondary winding 62 such that it is in a discharging path, along with engine ground 56. According to one example, current evaluator 190 is an opto-isolator that includes a light-emitting device 192 and a light-activated switch 194 and can transfer signals between two electrical circuits that are electrically isolated from one another, like the circuits that include battery ground 54 and engine ground 56. Another possibility for the current evaluator 190 is an isolated op amp, however, these devices are typically quite expensive. Light-emitting device 192 can be an LED with a first terminal 196 (e.g., an anode) connected to secondary winding 62, a second terminal 198 (e.g., a cathode) connected to engine ground 56, and is operably coupled to light-activated switch 194 so that when the amount of discharging current flowing through the LED exceeds a discharging current threshold, the LED emits light towards light-activated switch 194. Accordingly, the discharging current threshold is at least partially dictated by the properties of the light-activated device and/or switch (the more sensitive the devices, the lower the threshold) and should be as close to zero as possible, while still providing some immunity against noise in the system. Light activated-switch 194, which can be a phototransistor, a photodiode or the like, may include collector, base and emitter terminals 210, 212 and 214, respectively. When sufficient light from LED 192 is registered at base terminal 212, the light-activated switch 194 turns "on" and current flows from VDD, through resistor 220, switch 194 and engine ground 56. This causes the voltage to drop at discharging evaluation output 222, which is connected to feedback integration circuit 164 and outputs an active discharging signal. Discharging evaluation output 222 acts as an output for discharging evaluation circuit 162 and provides feedback integration circuit 164 with either an active or an inactive discharging signal. An optional resistor 230 may be connected in parallel to LED 192. It is possible for discharging evaluation circuit 162 to be arranged differently than shown in FIG. 4, so long as it is configured to output an active discharging signal when the discharging current 310 flowing through the discharging path exceeds a discharging current threshold and an inactive discharging signal when the discharging current does not exceed the discharging current threshold.

Feedback integration circuit 164 receives outputs from charging and discharging evaluation circuits 160, 162 and combines these outputs into a single, digital diagnostic signal that can then be provided to ECU 30 and/or some other device over a single output terminal 66. Combining these outputs into a single diagnostic signal that can then be provided over a single output terminal, gives ignition coil assembly 14 a very cost-effective way to continuously provide valuable feedback to ignition system 10 and/or the corresponding engine. This can be particularly useful in combustion engines that burn hydrogen fuel and/or certain other gases, as it is important for such engines to accurately monitor missed combustions due to wear or other malfunctions in the ignition coils and/or spark plugs. Since the diagnostic signal is a digital signal, it is less susceptible to cycle-to-cycle reliability issues that oftentimes affect analog signals, as these types of digital signals have greater immunity against electromagnetic disturbances and the like. According to the example illustrated in FIG. 4, the feedback integration circuit 164 includes a logic gate 240 (e.g., an OR gate) and a switch 242. OR gate 240 has a first input 250, a second input 252, and an output 254. First input 250 is connected to charging evaluation output 174 so that it can receive the charging signal from the charging evaluation circuit 160; second input 252 is connected to discharging evaluation output 222 so that it can receive the discharging signal from the discharging evaluation circuit 162; and output 254 is connected to switch 242 so that it can provide a combined charging and discharging signal that controls the state of the switch. Switch 242 can be any suitable type of electronic switch, including a negative metal-oxide semiconductor (NMOS) transistor or some other type of transistor, and includes drain, gate and source terminals 260, 262 and 264, respectively. In this particular arrangement, drain terminal 260 is connected to output terminal 66 and provides the diagnostic signals, gate terminal 262 is connected to the output 254 of OR gate 240, and source terminal 264 is connected to battery ground 54. It is possible for switch 242 to be omitted from feedback integration circuit 164 (e.g., the output of OR gate 240 could simply be provided to output terminal 66, with or without signal conditioning) or for switch 242 to be replaced with some other component(s). The operation of feedback integration circuit 164 is described more fully below.

Spark plugs 22-28 may be any suitable type of vehicle, industrial and/or other sparking or ignition device. This includes, but is not limited to, sparking or ignition devices designed to burn gasoline, diesel, natural gas, hydrogen, propane, biodiesel, ethanol and/or other types of combustible fuels; sparking or ignition devices that are used in cars, sport utility vehicles (SUVs), hybrid vehicles, light-duty trucks, medium-duty trucks, heavy-duty trucks, semi-trucks, buses, boats, aircraft, trains, construction equipment, mining equipment, tractors, generators, industrial engines and/or other applications; as well as sparking or ignition devices intended for use in various types of combustion engines, including naturally aspirated, turbo-charged and/or supercharged engines. Spark plugs 22-28 are not limited to any particular embodiment, so long as they can be used with ignition coil assemblies 14-20.

Engine control unit (ECU) 30, sometimes called an engine control module (ECM) or even a powertrain control module (PCM), is an electronic device that controls various systems and/or functions relating to a combustion engine, including certain aspects of ignition system 10. According to one example, ECU 30 includes one or more microprocessors, microcontrollers, microcontroller units (MCUs), central processing units (CPUs) and/or other types of electronic processing devices, as well as various inputs and outputs. As shown in FIG. 1, ECU 30 may include an input 280 connected to battery 12 for receiving battery power, an input 282 for receiving battery ground, four input/outputs 284-290 connected to ignition coil assemblies 14-20, respectively, for sending trigger signals and receiving diagnostic signals, and an optional input/output 292 for communicating with a vehicle bus or other communication network. Skilled artisans will appreciate that ECU 30 likely includes numerous other components, devices, inputs and/or outputs (e.g., inputs connected to different sensors around the engine, etc.), but for purposes of simplicity, they have been omitted here. ECU 30 preferably includes signal processing resources that enable it to evaluate and analyze the diagnostic signals provided by ignition coil assemblies 14-20 so that the ECU can better monitor and/or control different aspects of ignition system 10. For instance, it is possible for ECU 30 to use the diagnostic signals to better detect missed combustions or other malfunctions in the ignition coil and/or spark plugs, or to improve the performance of the ignition timing. It is also possible for ECU 30 to monitor and/or control ignition coil assemblies 14-20 on an individual basis, thus, taking into account conditions and circumstances unique to each assembly or spark plug. Other arrangements certainly are possible, as ECU 30 is only being provided as an example and may include any suitable type of control unit or module known in the art.

The terms "connected" and "coupled," as used herein, broadly include any suitable arrangements where electrical inputs, outputs, terminals, components, devices, units, circuits and/or other types of electrical elements are directly or indirectly connected or coupled to one another, including arrangements where an electrical element is connected or coupled to another electrical element with one or more intervening electrical elements located therebetween. For example, a switch terminal that is indirectly connected or coupled to an output via one or more intervening resistors, diodes, capacitors, inductors, transistors, etc., would still be "connected" or "coupled" to the output.

Figure 5:
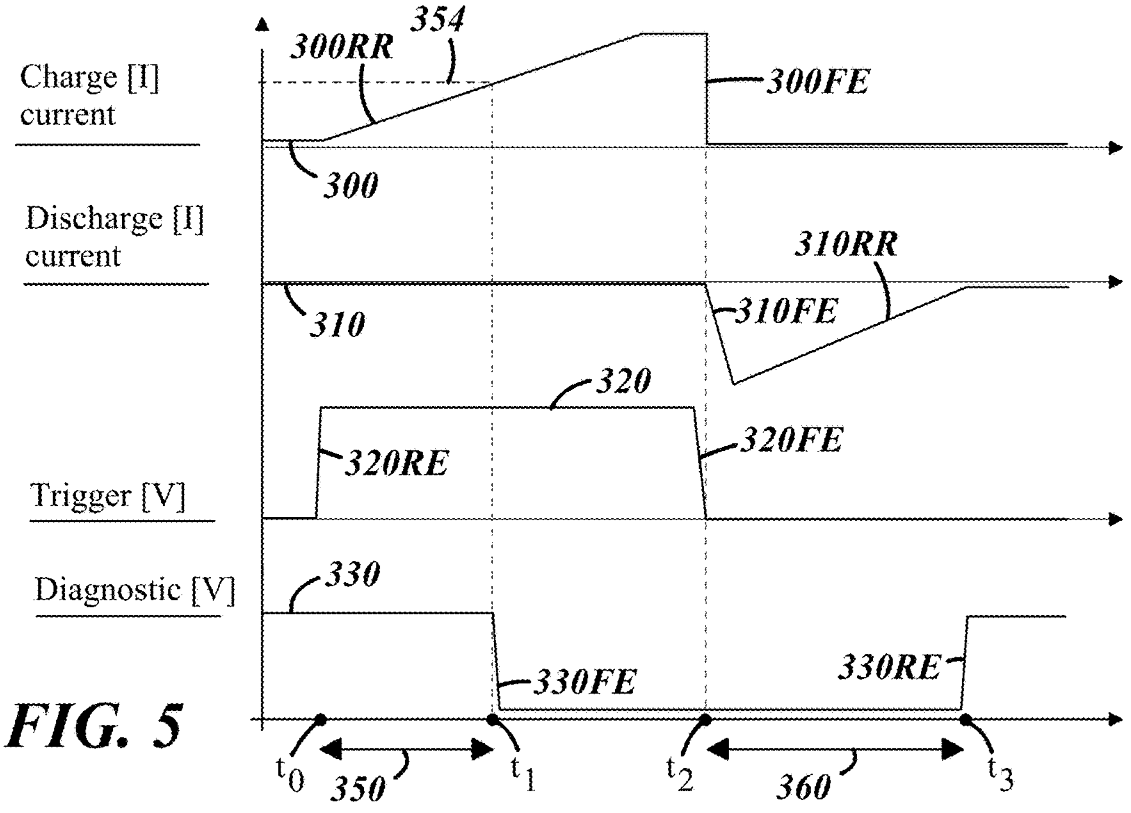
FIG. 5 is a timing graph of several exemplary waveforms and signals that could be used with a method of operating an ignition system, such as the one shown in FIG. 1.

Turning now to FIG. 5, there are shown several waveforms or timing graphs that represent different signals or currents used in the operation of ignition system 10 (charging current 300, discharging current 310, trigger signal 320, diagnostic signal 330). Starting at time to (start of the charging phase), ECU 30 sends the trigger signal 320 to switch 84, via driver circuit 112, which turns the switch "on" so that charging current 300 can begin to flow through primary winding 60 and charge ignition coil 58. This is reflected in the graphs, where a rising edge 320RE of the trigger signal corresponds to the start of a rising ramp 300RR in the charging current 300. At time to, there is little to no charging current 300 flowing through the charging path, which is the current path that includes primary winding 60, switch 84, resistor 170 and battery ground 54. Thus, there is little to no voltage drop across resistor 170 such that terminal 182 of op amp 172 sees a voltage that is less than a threshold voltage $V_{REF}$ applied to the other terminal 184, thereby causing the op amp and, hence, charging evaluation output 174 to provide feedback integration circuit 164 with an inactive charging signal. It should be noted that ignition circuit 64 can be configured with positive logic that provides "active" signals that are a standard "high" or "1" (e.g., standard transistor-to-transistor (TTL) voltage levels up to battery power voltage) and "inactive" signals that are a standard "low" or "0" (e.g., battery ground), or the ignition circuit could alternatively be configured with negative logic where "active" signals are "low" or "O" and "inactive" signals are "high" or "1." Similarly, ignition circuitry 64 could be configured so that rising edges are replaced with falling edges and vice-versa, as its not critical for the circuitry to specifically use high-to-low or low-to-high transitions, so long as a transition takes place. Any of these arrangements are feasible. The inactive charging signal causes feedback integration circuit 164 to generate a diagnostic signal 330 with an active value, which is why the diagnostic signal starts with a high value at time $t_0$.

From time to time $t_1$, the amount of charging current 300 flowing through primary winding 60 continues to increase along rising ramp 300RR. When the charging current 300 reaches a charging current threshold 354 at time $t_1$, the voltage drop across resistor 170 becomes such that the voltage at input 182 of op amp 172 exceeds the threshold voltage $V_{REF}$ and changes the output of the op amp to an active charging signal, which is then provided to input 250 of OR gate 240. This active or high input causes OR gate 240 to output an active or high value at its output 254, which turns "on" switch 242 so that its terminal 260 is connected to battery ground 54. Output terminal 66 correspondingly provides an inactive or low signal. This transition from active-to-inactive or high-to-low is represented by the falling edge 330FE in the diagnostic signal 330 at time $t_1$. The charging duration 350 ($t_1-t_0$) represents the amount of time it took for the charging current 300 to reach a predetermined charging current threshold 354 (corresponding to $V_{REF}$) and can be a useful piece of data for the ECU 30 analyze. For instance, if the charging current 300 reaches the charging current threshold 354 too quickly such that the charging duration 350 is less than a predetermined minimum amount of time (i.e., $(t_1-t_0)<\Delta_{t1MIN}$), then ECU 30 may conclude that a short exists in primary winding 60. If the charging current 300 reaches charging current threshold 354 in an expected amount of time that is greater than the minimum amount $\Delta_{t1MIN}$ but less than a predetermined maximum amount of time (i.e., $\Delta_{t1MIN}<(t_1-t_0)<\Delta_{t1MAX}$), then ECU 30 may determine that the primary winding 60 is functioning properly. If, on the other hand, the charging current 300 takes too long to reach the charging current threshold 354 such that the charging duration 350 is greater than the maximum amount of time (i.e., $(t_1-t_0)>\Delta_{t1MAX}$), then it could indicate that primary winding 60 has an unusually high impedance and is not functioning properly.

It is worth noting that charging duration 350 is not the same as dwell time, a more common parameter in ignition systems that corresponds to the amount of time that the ignition coil is being charged (e.g., the amount of time that switch 84 is turned "on"). The dwell time can be easily obtained, since it simply corresponds to the duration of the trigger signal (the ECU would already have this information) and does not provide meaningful feedback in terms of the state or condition of primary winding 60. Charging duration 350, on the other hand, provides the ECU with valuable information regarding the state or condition of primary winding 60 and does so over a multiplexed digital signal that is representative of both charging and discharging phases. The preceding examples represent only some of the potential ways in which ECU 30 could use or evaluate the diagnostic signal 330, as numerous other ways are possible as well.

This process of charging the ignition coil 58 continues until the trigger signal 320 transitions from a high value to a low value at falling edge 320FE around time $t_2$. This transition turns "off" switch 84, thus, preventing the charging current 300 from flowing in the charging path, as illustrated by the falling edge 300FE. The abrupt decrease in charging current 300 causes the magnetic field in ignition coil 58 to collapse, which results in a sudden flow of discharging current 310 through secondary winding 62, as represented by falling edge 310FE (this is shown as a falling edge in FIG. 5, as opposed to a rising edge, due to the opposite winding direction of the secondary winding versus the primary winding). The rapid flow of discharging current 310 results in a high-voltage ignition pulse being sent to the firing end 88 of spark plug 22, thereby causing a spark at spark gap 90 and initiating the combustion process. As discharging current 310 flows in the discharging path, which includes secondary winding 62, current evaluator 190, and engine ground 56, the current flow through light-emitting device 192 causes it to emit light, which in turn switches "on" light-activated switch 194. Since the circuit that includes the discharging path (engine ground circuit) is separate and electrically isolated from the circuit that includes feedback integration circuit 164 (battery ground circuit), a device such as an opto-isolator is used to bridge or transfer signals therebetween. When light-activated switch 194 turns "on," discharging evaluation circuit 162 outputs an active discharging signal, which is then provided to input 252 of OR gate 240. This active or high input causes OR gate 240 to maintain an active or high value at its output 254, which keeps switch 242 "on" so that its terminal 260 remains connected to battery ground 54. Accordingly, the diagnostic signal 330 is held at a low value at time $t_2$. Ignition coil 58 continues to discharge its stored energy until its depleted and the discharging current 310 returns to its initial state, as shown along rising ramp 310RR.

When ignition coil 58 is finished or nearly finished discharging at time $t_3$, the discharging current 310 flowing through the discharging path will decrease to the point where light-emitting device 192 no longer produces light and light-activated switch 194 turns "off," thereby causing the discharging evaluation circuit 162 to provide the feedback integration circuit 164 with a low or inactive discharging signal. With both OR gate inputs 250, 252 at low values, output 254 is also low and turns "off" switch 242 so that output terminal 66 is disconnected from battery ground 54. This causes the diagnostic signal 330 to transition from inactive-to-active or low-to-high at rising edge 330RE, which corresponds to time $t_3$. The discharging duration 360 $(t_3-t_2)$ represents the amount of time it took for the charge stored in ignition coil 58 to discharge and can be a useful piece of data for ECU 30 analyze. For example, the discharging duration 360 can be indicative of secondary winding and/or sparking performance, as it is correlated to the duration of the sparking event. If the discharging current 310 discharges too quickly such that the discharging duration 360 is less than a predetermined minimum amount of time (i.e., $(t_3-t_2)<\Delta t_{3MIN}$), then ECU 30 may conclude that a short exists in secondary winding 62. If the discharging current 310 discharges in an expected amount of time that is greater than the minimum amount $\Delta t_{3MIN}$ but less than a predetermined maximum amount of time (i.e., $\Delta t_{3MIN}<(t_3-t_2)<\Delta t_{3MAX}$), then ECU 30 may determine that the secondary winding 62 is functioning properly. Conversely, if the discharging current 310 takes too long to discharge (i.e., $(t_3-t_2)>\Delta t_{3MAX}$), then the ECU may conclude that there is an unacceptably high impedance in the secondary winding 62 and/or the spark plug 22.

It should be appreciated that the charging and/or discharging durations, as reflected in the diagnostic signal 330 can be used to diagnose and evaluate a whole host of other operating parameters, in addition to those mentioned above. Since the diagnostic signal 330 is a digital signal, electrically isolated from engine ground 56, it has a relatively high immunity against noises and enables information pertaining to both the charging and discharging phases to be effectively extracted by ECU 30.

Skilled artisans will recognize that the charging duration 350 and the discharging duration 360 are only partially defined by the diagnostic signal 330, as both the diagnostic signal and the trigger signal are needed to fully define those durations or time lapses (e.g., duration 350 begins with trigger signal rising edge 320RE and ends with diagnostic signal falling edge 330FE, and duration 360 begins with trigger signal falling edge 320FE and ends with diagnostic signal rising edge 330 RE). If ECU 30 was only in possession of diagnostic signal 330, it would not be able to fully evaluate the charging and discharging durations 350, 360, since it would only have information pertaining to the beginning of those durations. But since ECU 30 is the source of trigger signal 320 and, therefore, knows the timing of its rising and falling edges 320RE, 320FE, the ECU can use time measurement algorithms to evaluate the trigger and diagnostic signals together and determine the charging and discharging durations 350, 360 accordingly. In this way, the present method uses information from both a control signal being sent from ECU 30 to ignition coil assembly 14 (the trigger signal) and a feedback signal being sent from the ignition coil assembly to the ECU (the diagnostic signal) to determine certain durations. In different embodiments, the ignition circuitry 64 could be modified so that the diagnostic signal 330 fully defines the charging and/or discharging durations 350, 360.

The preceding examples represent only some of the potential ways in which the ECU 30 could use, interpret, evaluate, analyze and/or otherwise process information from the diagnostic signal 330, as numerous other ways are possible as well. The various current and voltage thresholds mentioned herein could easily be modified or customized for certain engines, ignition systems, spark plugs, etc. Furthermore, if reduced levels of immunity against electromagnetic interference can be accepted, it is possible for the ignition coil assembly to be provided as a unified four-pin electrical connector where a separate engine ground input terminal 56 has been omitted and is simply connected to battery ground 54 instead.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An ignition coil assembly for use in an ignition system, comprising:

a plurality of input terminals;

an output terminal;

an ignition coil having a primary winding and a secondary winding; and ignition circuitry having an ignition operational circuit and an ignition diagnostic circuit, the ignition operational circuit is configured to manage charging and discharging the ignition coil and is coupled to at least some of the input terminals and to the ignition coil, the ignition diagnostic circuit is configured to monitor different aspects of the ignition system and includes a charging evaluation circuit coupled to the primary winding, a discharging evaluation circuit coupled to the secondary winding, and a feedback integration circuit coupled to the charging evaluation circuit, the discharging evaluation circuit, and the output terminal, wherein the ignition diagnostic circuit is configured to provide continuous feedback to the ignition system by sending a diagnostic signal over the output terminal, the diagnostic signal includes information representative of both a charging phase and a discharging phase.

2. The ignition coil assembly of claim 1, wherein the plurality of input terminals include a first low-voltage input terminal configured to receive low-voltage battery power from a battery, a second low-voltage input terminal configured to receive a trigger signal from an engine control unit (ECU), a third low-voltage input terminal configured to receive battery ground, and a fourth low-voltage input terminal configured to receive engine ground, the plurality of input terminals and the output terminal are part of a unified multi-pin electrical connector.

3. The ignition coil assembly of claim 1, wherein the plurality of input terminals includes a low-voltage input terminal configured to receive battery ground and a separate low-voltage input terminal configured to receive engine ground, the battery ground and the engine ground are electrically isolated from one another so that the diagnostic signal is more immune to internal noise.

4. The ignition coil assembly of claim 1, wherein the ignition operational circuit includes a driver circuit and a switch, the driver circuit includes an input configured to receive trigger signals from an engine control unit (ECU) and an output configured to provide trigger signals to the switch, the switch is an insulated-gate bipolar transistor (IGBT) and includes a first terminal connected to the primary winding of the ignition coil, a second terminal connected to the output of the driver circuit and configured to receive trigger signals, and a third terminal connected to the ignition diagnostic circuit, and the ignition operational circuit is configured so that the trigger signals cause the switch to either be “on” such that charging current flows through the primary winding or “off” such that charging current does not flow through the primary winding.

5. The ignition coil assembly of claim 1, wherein the charging evaluation circuit includes a resistor, an operational amplifier, and a charging evaluation output, the resistor is connected in series with the primary winding in a charging path, the operational amplifier includes a first input connected to a terminal of the resistor, a second input connected to a reference voltage ($V_{REF}$), and an output connected to the charging evaluation output, the charging evaluation output is connected to the feedback integration circuit, the charging evaluation circuit is configured to output an active charging signal when a charging current flowing through the charging path exceeds a charging current threshold, and the charging evaluation circuit is configured to output an inactive charging signal when the charging current flowing through the charging path does not exceed the charging current threshold, and the charging current threshold is at least partially determined by the reference voltage ($V_{REF}$).

6. The ignition coil assembly of claim 1, wherein the charging evaluation circuit is configured to output an active charging signal to the feedback integration circuit when a charging current flowing through a charging path is greater than a charging current threshold, the feedback integration circuit is configured to combine the active charging signal with output from the discharging evaluation circuit to generate the diagnostic signal, the diagnostic signal includes a rising edge or a falling edge ($t_1$) that is representative of the active charging signal and can be used, in conjunction with a separate trigger signal ($t_0$), to determine a charging duration ($t_1-t_0$), the charging duration corresponds to an amount of time taken for the charging current to exceed the charging current threshold, and the charging duration is representative of a state or a condition of the primary winding.

7. The ignition coil assembly of claim 1, wherein the discharging evaluation circuit includes an opto-isolator with a light-emitting device and a light-activated switch, a resistor, and a discharging evaluation output, the light-emitting device is connected in series with the secondary winding in a discharging path, the light-activated switch is operably coupled to the light-emitting device and includes a terminal connected to a terminal of the resistor, the discharging evaluation output is connected to the feedback integration circuit, the discharging evaluation circuit is configured to output an active discharging signal when a discharging current flowing through the discharging path exceeds a discharging current threshold, and the discharging evaluation circuit is configured to output an inactive discharging signal when the discharging current flowing through the discharging path does not exceed the discharging current threshold, and the discharging current threshold is at least partially determined by properties of the light-emitting device and/or the light-activated switch.

8. The ignition coil assembly of claim 1, wherein the discharging evaluation circuit is configured to output an active discharging signal to the feedback integration circuit when a discharging current flowing through a discharging path is less than a discharging current threshold, the feedback integration circuit is configured to combine the active discharging signal with output from the charging evaluation circuit to generate the diagnostic signal, the diagnostic signal includes a rising edge or a falling edge ($t_3$) that is representative of the active discharging signal and can be used, in conjunction with a separate trigger signal ($t_2$), to determine a discharging duration ($t_3-t_2$), the discharging duration corresponds to an amount of time taken for the discharging current to fall below the discharging current threshold, and the discharging duration is representative of a state or a condition of the secondary winding or a corresponding spark plug.

9. The ignition coil assembly of claim 1, wherein the feedback integration circuit includes a logic gate and a switch, the logic gate includes a first input connected to a charging evaluation output of the charging evaluation circuit and configured to receive a charging signal, a second input connected to a discharging evaluation output of the discharging evaluation circuit and configured to receive a discharging signal, and an output configured to provide a combined charging and discharging signal, the switch includes a first terminal connected to the output terminal and a second terminal connected to the output of the logic gate and configured to receive the combined charging and discharging signal, and the feedback integration circuit is configured to utilize the combined charging and discharging signal to output the diagnostic signal over the output terminal.

10. The ignition coil assembly of claim 1, wherein the diagnostic signal includes information representative of both a charging signal generated during the charging phase and a discharging signal generated during the discharging phase, and the ignition circuitry is configured to combine the charging signal and the discharging signal into the diagnostic signal and to provide the combined diagnostic signal over the output terminal, which is a single pin in a multi-pin electrical connector.

11. A method of operating an ignition coil assembly for use in an ignition system, the ignition coil assembly comprises:

a plurality of input terminals;

an output terminal;

an ignition coil having a primary winding and a secondary winding; and ignition circuitry having an ignition operational circuit and an ignition diagnostic circuit, wherein the ignition diagnostic circuit includes a charging evaluation circuit coupled to the primary winding, a discharging evaluation circuit coupled to the secondary winding, and a feedback integration circuit coupled to the charging evaluation circuit, the discharging evaluation circuit, and the output terminal;

the method comprises the steps of:

managing charging and discharging of the ignition coil with the ignition operational circuit;

monitoring different aspects of the ignition system with the ignition diagnostic circuit; and providing continuous feedback from the ignition diagnostic circuit to the ignition system by sending a diagnostic signal over the output terminal, wherein the diagnostic signal includes information representative of both a charging phase and a discharging phase.

12. The method of claim 11, wherein the monitoring step further comprises monitoring a charging current flowing through a charging path that includes the primary winding, a switch and a resistor, and using an op amp to compare a voltage at a terminal of the resistor to a threshold voltage $V_{REF}$ and outputting an active charging signal when the voltage exceeds the threshold voltage, thereby indicating that the charging current has exceeded a charging current threshold.

13. The method of claim 11, wherein the providing continuous feedback step further comprises sending a diagnostic signal that combines an active charging signal from the charging evaluation circuit with output from the discharging evaluation circuit, the diagnostic signal includes a rising edge or a falling edge ($t_1$) that is representative of the active charging signal, and further comprising the steps of:

evaluating the diagnostic signal at an engine control unit (ECU), in conjunction with a separate trigger signal ($t_0$), to determine a charging duration ($t_1-t_0$), the charging duration corresponds to an amount of time taken for a charging current flowing through a charging path that includes the primary winding to reach a charging current threshold, and determining a state or a condition of the primary winding based on the charging duration.

14. The method of claim 11, wherein the monitoring step further comprises monitoring a discharging current flowing through a discharging path that includes the secondary winding and a current evaluator with a light-emitting device and a light-activated switch, ceasing to emit light from the light-emitting device when the discharging current flowing through the discharging path does not exceed a discharging current threshold, turning "off" the light-activated switch when the light-emitting device ceases to emit light, and outputting an active discharging signal when the light-activated switch is turned "off," thereby indicating that the discharging current has fallen below the discharging current threshold.

15. The method of claim 11, wherein the providing continuous feedback step further comprises sending a diagnostic signal that combines an active discharging signal from the discharging evaluation circuit with output from the charging evaluation circuit, the diagnostic signal includes a rising edge or a falling edge ($t_3$) that is representative of the active discharging signal, and further comprising the steps of:

evaluating the diagnostic signal at an engine control unit (ECU), in conjunction with a separate trigger signal ($t_2$), to determine a discharging duration ($t_3-t_2$), the discharging duration corresponds to an amount of time taken for a discharging current flowing through a discharging path that includes the secondary winding to fall below a discharging current threshold, and determining a state or a condition of the secondary winding or a corresponding spark plug based on the discharging duration.

16. The method of claim 11, wherein the providing continuous feedback step further comprises sending a multiplexed digital diagnostic signal that includes information from an active charging signal from the charging evaluation circuit and information from an active discharging signal from the discharging evaluation circuit, the multiplexed digital signal is sent over a single output terminal.

17. The method of claim 11, wherein the plurality of input terminals include a low-voltage input terminal configured to receive battery ground and a separate low-voltage input terminal configured to receive engine ground, the battery ground and the engine ground are electrically isolated from one another so that the diagnostic signal is more immune to internal noise.

18. The method of claim 11, further comprising the step of receiving the diagnostic signal at an engine control unit (ECU) that is part of the ignition system for an engine that burns hydrogen fuel, and using the diagnostic signal to determine if the hydrogen burning engine has experienced any missed combustions.

* * * * *